May 31, 1927.

O. W. HAHN 1,630,792

AUTOMOBILE JACK

Filed Jan. 4, 1926

Inventor

OTTO W. HAHN.

By Miller & Boyken

Attorneys

Patented May 31, 1927.

1,630,792

UNITED STATES PATENT OFFICE.

OTTO W. HAHN, OF SAN FRANCISCO, CALIFORNIA, ASSIGNOR TO UNIVERSAL JACK & HOIST CORPORATION.

AUTOMOBILE JACK.

Application filed January 4, 1926. Serial No. 79,087.

This invention relates to jacks or devices for lifting up the axles of road vehicles generally but especially those of automobiles and whereby the wheels on the axle lifted are raised from the ground.

The objects of my invention are to provide an improved mechanism of the kind outlined which may be used to quickly and easily raise the axle at either end of the vehicle a considerable height from the ground, so that the vehicle will stand at an angle permitting a workman to work on its under side without crawling upder the vehicle, and the provision of such a device which is not limited to this specific work but is adaptable to varied lifting use in working about such vehicles, also such a device which will be comparatively simple and safe in operation so as to avoid danger of the raised vehicle from falling.

Figure 1:
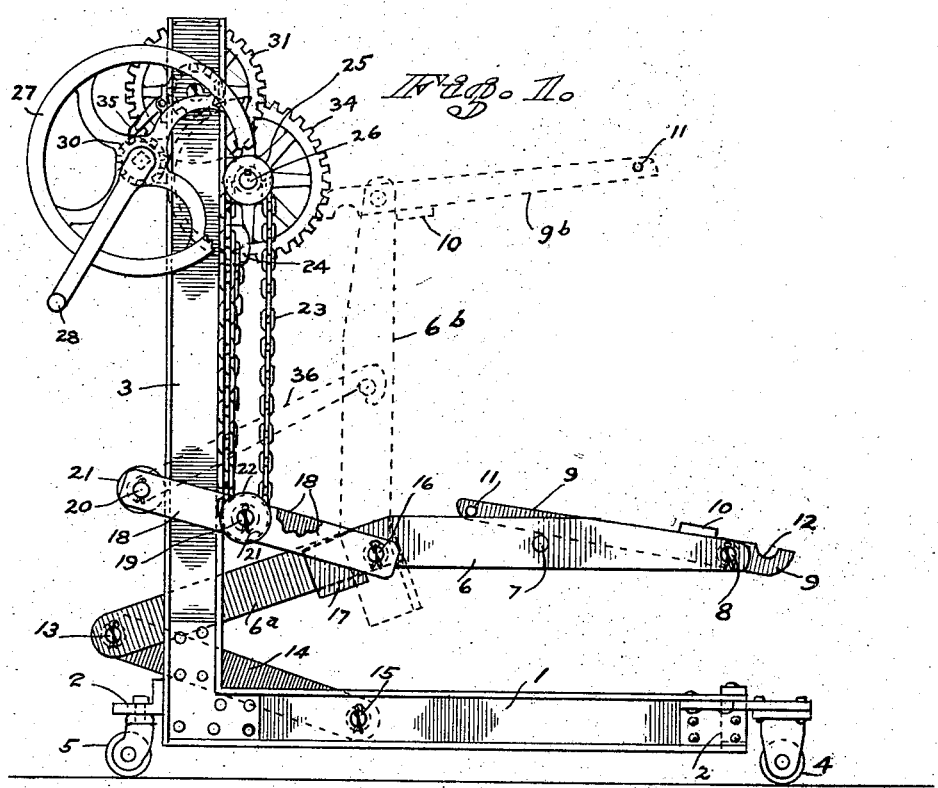
Figure 2:
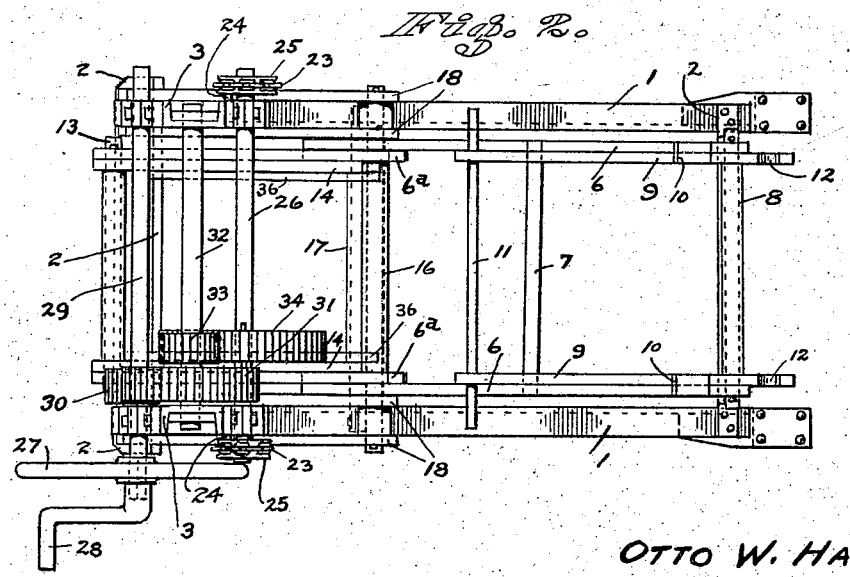

In the drawings accompanying this application I show the preferred embodiment of my invention, Figure 1 being a side elevation of the device with jack arms partially raised and with dotted lines showing the arms unfolded for use as a hoist, while Figure 2 is a plan view of Figure 1.

Briefly described the device consists of a portable frame carrying a pair of laterally projecting jack arms which may be positioned under the axle of an automobile and the vehicle quickly lifted by the operation of hand gearing located on the frame, without the operator reaching under the vehicle at all.

In the drawing the portable frame consists of a pair of spaced horizontal channel members 1 suitably braced and joined by bars as at 2 and carrying a pair of upright channels 3. These members are all of a size to provide the necessary strength and are riveted or welded to form a rigid frame.

Four rollers support the frame so that it may easily be rolled about and it has been found best to have the two rollers 4 on the free ends of the frame members 1 fixed in their path of rotation, with the other two, 5, of the swiveling type so that when in use the free ends will not have a tendency to move sidewise.

Mounted on this frame is a leverage system adapted to extend under the automobile to lift its axle, and this system comprises a pair of spaced laterally projecting arms 6 braced by the rods 7 and 8 and pivotally supporting on the rod 8 another pair of lever arms 9 braced by rods 11 and lugs 10 and formed each with a socket 12 positioned beyond but close to the pivotal point 8.

In normal position the arms 9 lie in the position shown in Figure 1 resting on rod 7 or 11.

At the rear end the main arms 6 are pivotally mounted at 16 on a pair of arms 6ª which in turn are pivoted on a bar 13 to a pair of links 14 extending downwardly and forwardly and pivotally connected to the sides of the frame members 1 by the bar 15.

In ordinary use as a lifting jack the arms 6 and 6ª virtually form a pair of single arms and could just as well be made in one piece, but they are made in two pieces so as to be unfoldable to the dotted position 6ᵇ when using the device more as a hoist than as a jack.

To make the pivoted arms 6 act rigidly with the arms 6ª the rear ends of arms 6 extend beyond the pivotal bar 16 and a heavy cross bar or brace 17 is welded or otherwise secured to join the rear ends of the bars 6 so that when in position shown in Figure 1 the brace will lie against the under side of arms 6ª, so that the arms 6 while rigid with arms 6ª in horizontal extension are pivoted for swinging to the dotted position.

Extending at an angle rearwardly and upwardly from pivot bar 16 are two pairs of links 18, each upright or post 3 being loosely embraced by two of the links, and the two pairs of links are connected and aligned by bars 19 and 20.

Between each pair of links 18 in contact with the front and back of posts 3 are idler rollers 21 pivotally mounted on the bars 19 and 20 so that the links in being raised or lowered will be guided in a vertical path by the rollers against the posts.

The bars 19 project beyond the links 18 at both sides of the device and revolvably support at each end a chain idler wheel 22 around which a chain 23 is passed for lifting and lowering the links.

The chain is arranged in duplicate on both sides of the device and each chain is secured at one end to a clip 24 attached to the post thence extends downwardly around the idler 22 and up over a chain pocket wheel 25 mounted on a power shaft 26 of any suitable hoisting gear located at the upper end of the frame.

In the embodiment of my invention here shown, but without being restricted thereto I show the hoisting gear consisting of a handwheel 27 with hand crank 28 secured to a shaft 29 mounted in suitable bearings on the posts and carrying a pinion 30 meshing with gear 31 mounted on the shaft 32 extending from post to post, and on the shaft 32 is a pinion 33 meshing with a large gear 34 mounted on the shaft 26 to which the chain pocket wheels 25 are secured.

By this arrangement a turning of the crank winds the chain over the pocket wheels with free end of chain falling loosely and exerts a powerful pull on the links 18, doubled in force through the use of the idler 22 which gives the block effect.

It is to be understood however that any other hoist arrangement for raising the links 18 may be used in place of the one described as I have tried several of the well known chain block arrangements as well as a common threaded bar for raising and lowering the links, but prefer the arrangement shown.

Also the use of a coil chain and pocket wheels is understood to be the equivalent of any other type of chain and sprockets, and it is optional as to whether the power be compounded by the use of the idler 22.

After raising the load the hoist is locked by a pawl as at 35, and may be quickly lowered by releasing the pawl, slipping the crank 28 from the squared end of the shaft 29 and restricting the handwheel against too rapid spinning by slight pressure of the hand or a stick thereagainst.

Upon suspending or lowering the load, the disposition of links 18 hanging on a suspended fulcrum 19 causes the rollers 21 to engage the posts 3 and thereby remove some of the effective weight of the load from the suspending chains 23.

In use to jack up the front or rear end of an automobile, the device is rolled to the position desired and the arms 6 projected under the axle of the vehicle to be lifted so that it will rest in the sockets 12, and whereupon the hoist is operated.

Due to the pivotal mounting of sockets 12 close to the bar 8, the upper pair of arms 9 will tip to conform to the angle of the vehicle as it is lifted and the small bar 11 or extending arms 9 will lie against the radiator or cross bar members of the chassis frame of the vehicle, or a plank is used extending across any of the chassis elements to receive the arms 9.

The vehicle may thus be lifted to an angle of thirty degrees or more in a few moments time with little effort, and the jack though on rollers will not slip out of place, but on the contrary will, on account of the location of the load, adjust itself forward or backward to the most stable position.

When it is desired to use the device as a hoist for lifting an engine out of the chassis, or similar work, the arms 6 and 9 are swung to the dotted position, lugs 10 forming a stop to hold arms 9 in the position 9$^b$ and the bar 11 serving as a point from which to suspend the load.

When in this position the arms 6$^b$ are supported by a pair of auxiliary bracing links 36 pivotally mounted on the bar 20.

By the arrangement of levers and arms described I gain the effect of a comparatively great lateral extension of the jack arms without interfering members liable to get in the way of the vehicle being lifted, yet by the application of power through means of the angularly extending rolling links 18 and links 14 I gain a device which rises vertically without displacing the load and rises with increasing speed due to the toggle nature of links 14 as the angular disposition of the lifted vehicle decreases the effective load upon the jack arms.

I claim:

1. A jack of the character described comprising a supporting frame including an upright, a laterally extending jack arm, a link at the rear end of said jack arm pivotally connected to the same and to the frame to permit vertical pivotal movement to said arm, and means pivotally connected to said arm intermediate its ends and guided for vertical movement on said frame.

2. A jack of the character described comprising a supporting frame including a pair of spaced uprights, a pair of laterally extending jack arms, one adjacent each of said uprights, a link at the rear end of each jack arm pivotally connected thereto and to the frame to permit vertical pivotal movement to said arms, and a member at each upright guided for vertical movement thereby pivotally connected respectively to said jack arms at an intermediate point.

3. A structure as specified in claim 1, the pivotal connection of said link to the frame being at a point forward of its pivotal connection to the arm and at a point below the arm.

4. A jack of the character described comprising a supporting frame including a pair of spaced uprights, a pair of laterally extending jack arms linked at their rearward ends to said frame, links pivoted to and extending from said arms embracing said posts and provided with means guided by the posts, and hoisting means carried by the posts effective on said links for raising the same and thereby the jack arms.

5. A structure as specified in claim 4, said hoisting means including a hoist chain arranged to pull upwardly on said links at a point forward of the posts.

6. A structure as specified in claim 4, said hoisting means including a pair of chains extending from the hoisting elements and each passing around an idler carried by the links embracing each post respectively and with one end of the chain secured to the post, whereby to secure a chain block effect in raising the links thereby.

7. A structure as specified in claim 2, said arms being formed of pivoted sections adapted to swing from a laterally extended jacking position to an inverted L arm hoist position, and means for bracing the arms in this latter position.

8. In a structure as specified in claim 2, a second pair of arms pivotally mounted on the jack arms and provided with axle engaging means.

9. In a structure as specified in claim 2, a second pair of arms pivotally mounted on the jack arms and provided with axle engaging means, said second pair of arms extending forwardly with respect to the vehicle being lifted when used on the front axle thereof, so as to give additional support to the chassis members of the vehicle.

10. A structure as specified in claim 2, said arms being formed of a plurality of sections pivoted together and provided with stops to hold them in operative position.

11. A structure of the character described including a pair of laterally extending lifting arms, and means for lifting the same, said arms being pivotally mounted to swing to substantially vertical position, means to hold said arms in said position and a second pair of arms pivoted to the first mentioned arms to swing to a position extended substantially at right angles therefrom when said first mentioned arms are in vertical position, and means for bracing the second pair of arms in extended position.

OTTO W. HAHN.